United States Patent
Parikka

(10) Patent No.: US 6,592,233 B1
(45) Date of Patent: Jul. 15, 2003

(54) LIGHTING DEVICE FOR NON-EMISSIVE DISPLAYS

(75) Inventor: Marko Parikka, Halikko (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/677,907

(22) Filed: Oct. 3, 2000

(51) Int. Cl.$^7$ ................................. F21V 7/04

(52) U.S. Cl. .................. 362/31; 362/333; 362/561; 362/26

(58) Field of Search ................ 362/26, 31, 561, 362/551, 332, 333

(56) References Cited

U.S. PATENT DOCUMENTS

| | | | |
|---|---|---|---|
| 5,668,913 A | 9/1997 | Tai et al. ............ 385/146 |
| 5,671,994 A | 9/1997 | Tai et al. ............ 362/31 |
| 6,108,059 A | * 8/2000 | Yang ............ 349/117 |
| 6,295,104 B1 | * 9/2001 | Egawa et al. ........ 349/63 |

FOREIGN PATENT DOCUMENTS

EP    0979991    11/1998   ........... F21V/8/00

OTHER PUBLICATIONS

Patent Abstracts of Japan, vol. 2000, No. 04, Aug. 31, 2000 & JP 2000 011723 A (Minebea Co. Ltd.), Jan. 14, 2000 abstract.

* cited by examiner

Primary Examiner—Stephen Husar
Assistant Examiner—John Anthony Ward
(74) Attorney, Agent, or Firm—Ware, Fressola, Van Der Sluys & Adolphson LLP

(57) ABSTRACT

A method and device for improving lighting of a display having a top surface for viewing. The device includes a light guiding panel located substantially on the top surface of the display and at least one linear light source located adjacent to the light guiding panel for providing light thereto, wherein the light guiding panel has a first surface adjacent to the top surface of the display, a second surface opposite to the first surface, and at least one side edge for admitting a portion of the light provided by the linear light source through the side edge into the light guiding panel between the first and second surfaces; and the second surface includes a plurality of elongated grooves having dense-rare boundaries for reflecting part of the admitted light in a total-internal reflection fashion towards the display through the first surface of the light guiding panel, and wherein the dense-rare boundaries have a distribution density which varies depending on a distance between the dense-rare boundaries and the side edge.

15 Claims, 6 Drawing Sheets

LIGHTING DEVICE FOR NON-EMISSIVE DISPLAYS

FIELD OF THE INVENTION

The present invention relates generally to a lighting device and, in particular, to a lighting device to be placed in front of a panel to illuminate the panel.

BACKGROUND OF THE INVENTION

In order to improve the viewing of the non-emissive display, especially reflective type B/W and color display, one may place a light guiding panel on top of the display and adjacent to a light source in order to direct the light produced by the light source onto the viewing surface of the display. Typically, light is channeled into one or more edges of the light guiding panel. In U.S. Pat. No. 5,835,661, Tai et al. discloses a light guiding panel wherein a plurality of reflecting grooves are provided on the top surface of the light guiding panel in order to reflect the light introduced into the edges towards the display. As disclosed in U.S. Pat. No. 5,835,661, the reflecting grooves are uniformly distributed over the top surface of the light guiding panel. Accordingly, the illumination on the display is uneven such that the display section near the light source appears much brighter than the display section further away from the light source. This uneven illumination is more pronounced when the thickness of the light guide is reduced. The uniformly distributed grooves may also produce Moire patterns if the spacing of the pixels in the display is slightly different from the groove spacing. Using the light guiding panel, as disclosed U.S. Pat. No. 5,835,661, specular reflection of the illuminating light and ambient light from the lower surface of the light guiding panel further reduces the viewing quality of the display. In order to reduce this specular reflection, one may provide an anti-reflection coating, such as a thin film, on the lower surface. The anti-reflection coating is, in general, expensive because one or more additional steps must be carried out in order to apply the coating on the light guiding panel during the manufacturing process.

There are a number of known ways to provide light to a light guiding panel. For example, a cold cathodic fluorescent tube (CCFT) can be used as a light source and can be placed near the edge of light guiding panel to provide light into the light guiding panel. A CCFT typically consists of a glass tube, coated with phosphor on the inside of the glass tube, which is hermetically sealed and evacuated. When a high voltage is applied across the tube ends, plasma is formed to excite the phosphor for light production. The CCFT is relatively large as compared to the thickness of the light guide. It is especially bulky when it is used in a portable communication device such as a mobile phone. In U.S. Pat. No. 5,835,661, Tai et al. also discloses a linear light pipe which can be made sufficiently thin to be used as a light source to provide illumination to a display in a portable communication device. However, the linear light pipe, as disclosed U.S. Pat. No. 5,835,661, is not very efficient in that the light rays exiting the linear light pipe surface towards the edge of the light guiding panel are scattered in a random fashion. Thus, only a small portion of the light available from the linear light pipe is actually directed towards the viewing surface of the display.

Thus, it is desirable and advantageous to provide a method and a device for improving the front lighting of a non-emissive panel or display.

SUMMARY OF THE INVENTION

The first aspect of the present invention is to provide a method for improving lighting of a display having a top surface for viewing. The method comprises the steps of:

providing a light guiding panel substantially on the top surface of the display; and providing at least one light source adjacent to the light guiding panel for providing light thereto, wherein the light guiding panel has a lower surface facing the top surface of the display, an upper surface, and at least one side edge for admitting a portion of the light provided by the light source through the side edge into the light guiding panel between the upper and lower surfaces, wherein the upper surface includes a plurality of grooves having dense-rare boundaries substantially facing the light source for reflecting part of the admitted light in a total-internal reflection fashion towards the display through the lower surface of the light guiding panel, and wherein the dense-rare boundaries have a distribution density which varies according to a distance between the dense-rare boundaries and the side edge.

Preferably, the distribution density increases with the distance.

Preferably, the lower surface includes a reflection reduction structure to reduce unwanted reflection of light from the lower surface towards the upper surface.

Preferably, the reflection reduction structure comprises a plurality of periodic grooves, wherein the periodic grooves have a pitch, which is smaller than half the dominant wavelength range of the light provided by the light source.

The second aspect of the present invention is a lighting apparatus for a display having a top surface for viewing. The apparatus comprises:

a light guiding panel located substantially on the top surface of the display; and at least one linear light source located adjacent to the light guiding panel for providing light thereto, wherein the light guiding panel has a lower surface facing the top surface of the display, an upper surface, and at least one side edge for admitting a portion of the light provided by the linear light source through the side edge into the light guiding panel between the upper and lower surfaces, and the upper surface includes a plurality of grooves having dense-rare boundaries substantially facing the light source for reflecting part of the admitted light in a total-internal reflection fashion towards the display through the lower surface of the light guiding panel, and wherein the dense-rare boundaries have a distribution density which varies according to the distance between the dense-rare boundaries and the side edge.

Preferably, the linear light source includes:

a linear light pipe having a peripheral surface and at least one light-input end; and at least one light emitter adjacent the light-input end for providing light thereto, and wherein the peripheral surface allows the light provided by the light emitter to transmit therethrough towards the side edge of the light guiding panel.

Preferably, the linear light pipe has a longitudinal axis substantially parallel to the side edge, and the peripheral surface has a cross section substantially perpendicular to the longitudinal axis, wherein the cross section includes a curved section adjoining a reflecting surface which is located away from the side edge of the light guiding panel in order to reflect light towards the side edge through the curved section.

Preferably, the curved section has a spherical-shaped section adjacent the side edge for focusing the light reflected by the reflecting surface towards the side edge.

Preferably, a plurality of scatterers are provided on the reflecting surface to scatter light towards the curved section.

Alternatively, the curved section joins the side edge such that the linear light pipe is an integral part of the light guiding panel.

The third aspect of the present invention is to provide a light guiding panel which comprises: a first surface, an opposing second surface and at least one side edge, wherein the first surface has a plurality of grooves having dense-rare boundaries substantially facing the side edge so as to reflect light admitted through the side edge into the light guiding panel between the first and second surfaces towards the second surface, and wherein the dense-rare boundaries have a distribution density which varies according to the distance between the dense-rare boundaries and the side edge.

Preferably, the light guiding panel further comprises a reflection reduction structure provided on the second surface.

Preferably, the reflection reduction structure includes a plurality of periodic grooves.

The present invention will become apparent upon reading the description taken in conjunction with FIGS. 1 to 8.

DETAILED DESCRIPTION

Figure 1:
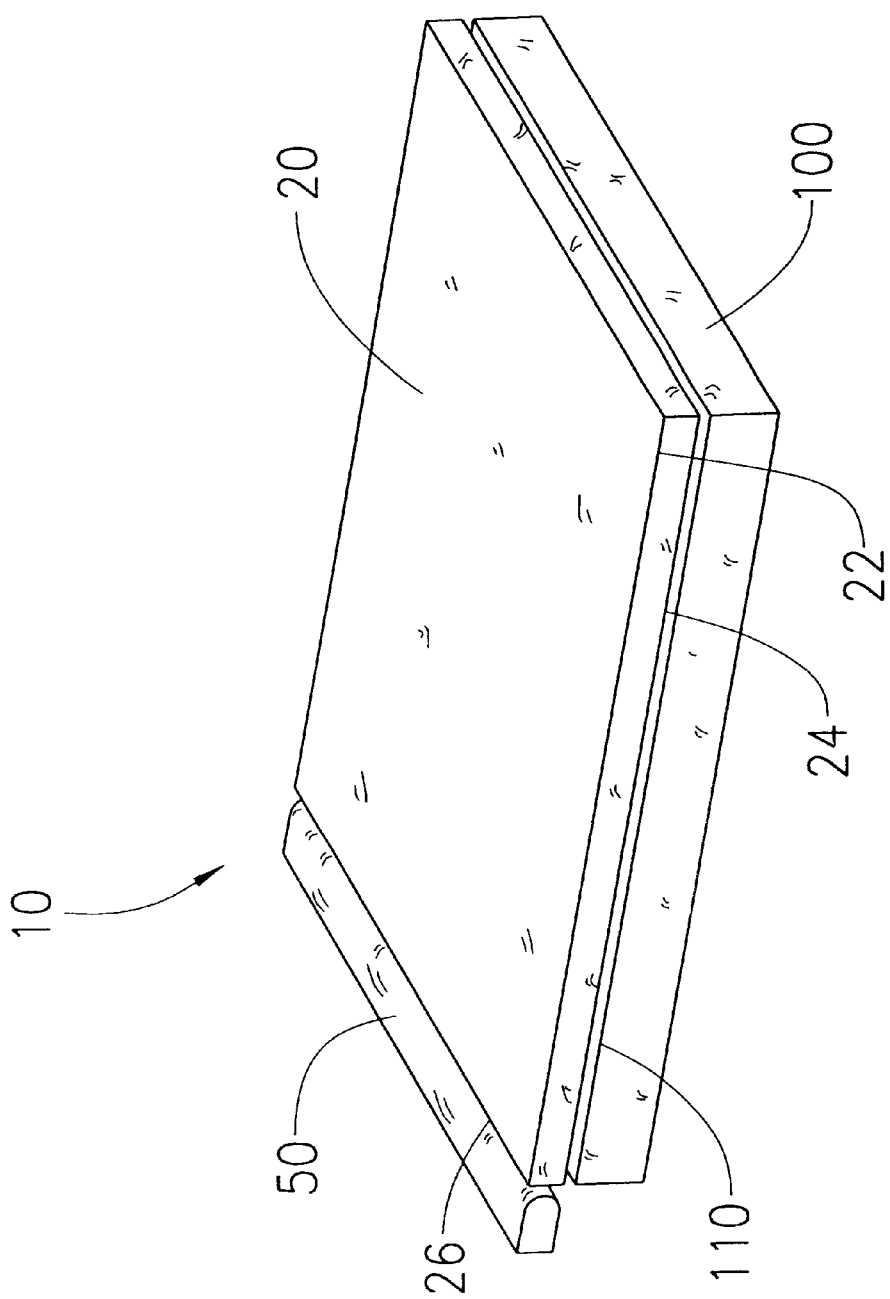
FIG. 1 is a diagrammatic representation illustrating a front-lighting device provided on top of a display.

FIG. 1 illustrates a front-lighting device 10 provided on top of a display 100. As shown in FIG. 1, the front-lighting device 10 includes a light-guiding panel 20 and a linear light source 50. The light-guiding panel 20 has an upper surface 22 and a lower surface 24 which is substantially located on top of the upper surface 110 of the display 100. The linear light-source 50, located adjacent to a side edge 26 of the light guiding panel 20, is used to provide light to illuminate the display 100 through the light guiding panel 20 so that the display 100 can be viewed more clearly through the upper surface 110 and the light guiding panel 20.

Figure 2A:
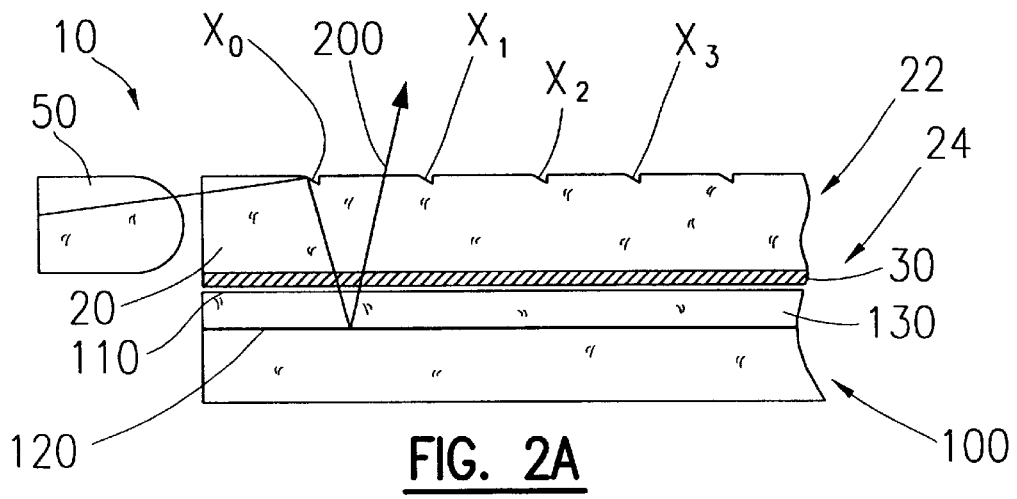
FIG. 2a is a cross sectional view illustrating the principle of a front-lighting device when it is provided on a display having a transparent top surface.
Figure 2B:
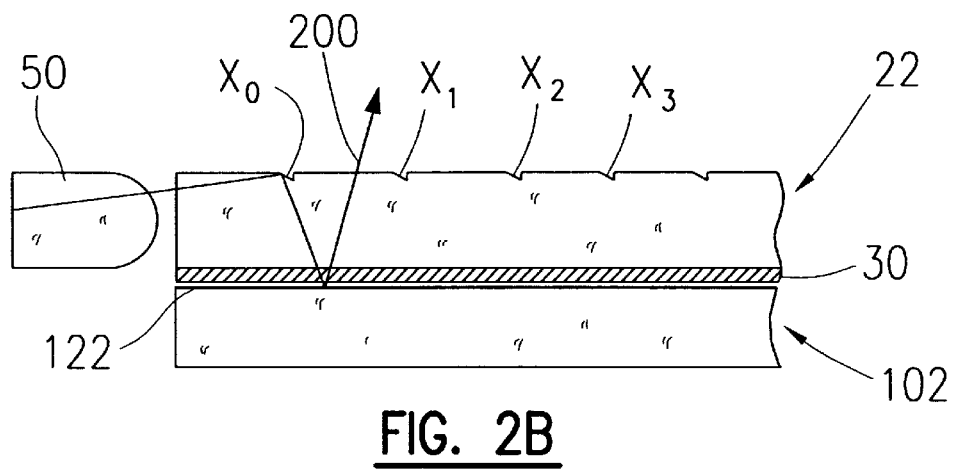
FIG. 2b is a cross sectional view illustrating the principle of a front-lighting device when it is provided on a panel.
Figure 2C:
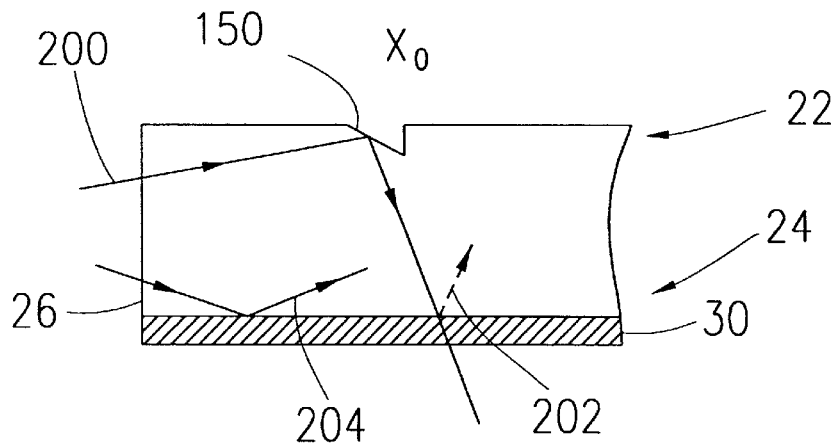
FIG. 2c is a diagrammatic representation illustrating the reflection of a light beam encountering a reflecting groove on a light guiding panel.

As shown in FIG. 2a, the upper surface 22 of the light guiding panel 20 has a plurality of grooves $X_0, X_1, \ldots, X_n$ to reflect light from the light source 50 towards the lower surface 24 of the light guiding panel 20 through the upper surface 110 to reach a lower layer 120 of the display 100. As shown in FIG. 2c, each groove $X_n$ has a dense-rare boundary 150 which is substantially facing the side edge 26 of the light guiding panel 20 so that when a light ray 200 coming from the direction of the side edge 26 encounters the dense-rare boundary 150 at a reasonably large angle of incidence, it undergoes total internal reflection to be directed towards the lower surface 24 of the light guiding panel 20. It should be noted that, when the light ray 200 encounters the dense-rare boundary at the lower surface 24, part of the light energy, as indicated by reference numeral 204, will be reflected back into the light guiding panel 20. In order to reduce this type of Fresnel reflection at the lower surface 24 of the light guiding panel 20, it is advantageous to provide a reflection reduction structure 30. It should be noted that the reflection reduction structure 30 is used to reduce only the unwanted reflection of light rays having an angle of incidence smaller than a certain angle. For example, the reflection reduction structure 30 is used to reduce the Fresnel reflection of light rays with an angle of incidence smaller than 30 degrees, while allowing light rays with an angle of incidence larger than 30 degrees to reflect back to the light guiding panel 20. As shown in FIG. 2c, light ray 202 is reflected by the structure 30 back to the light guiding panel 20. Typically, the display 100, as shown in FIG. 2a, is a non-emissive type display, such as an LCD panel. In that case, the light reflected by the grooves $X_0, X_1, \ldots, X_n$ transmits through a transparent, top layer 130 to reach a liquid-crystal layer as indicated by the lower layer 120 so that the information displayed on the lower layer 120 can be viewed or read more clearly. It should be noted that the front-lighting device 10 of the present invention can also be used on a panel 102 which does not have a transparent layer on top of the displayed text or graphics on the upper layer 122, as shown in FIG. 2b.

Figure 3A:
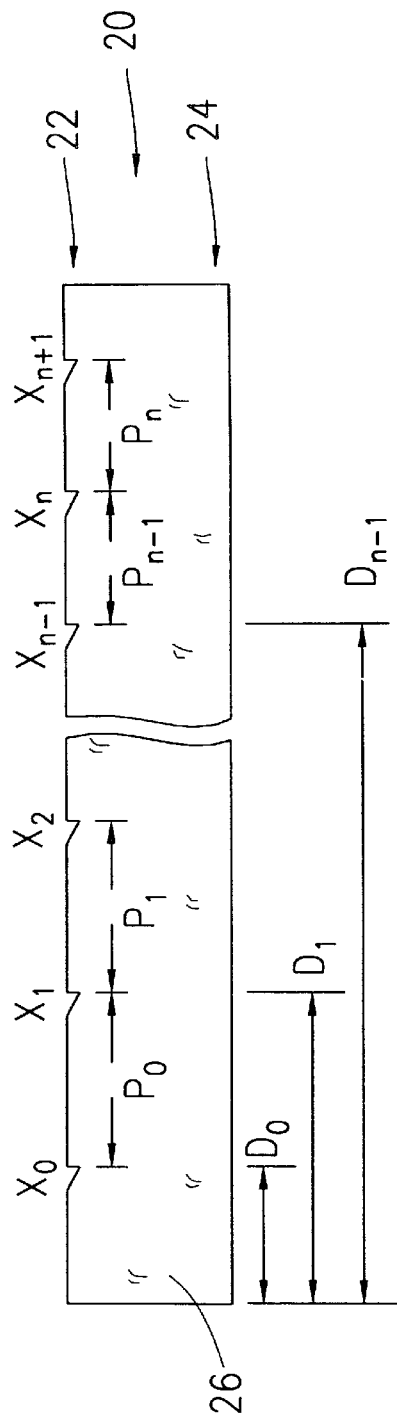
FIG. 3a is a cross sectional view illustrating the distributing density of the reflecting grooves on the upper surface of the light guiding panel, according to the preferred embodiment of the present invention.

FIG. 3a is a cross sectional view illustrating the distributing density of the reflecting grooves on the upper surface 22 of the light guiding panel 20, according to the preferred embodiment of the present invention. The reflecting grooves, as shown in FIG. 3a, are denoted by $X_0, X_1, X_2, \ldots, X_{n-1}, X_n, X_{n+1}$. The spacing between two adjacent grooves $X_0, X_1, X_2, \ldots, X_{n-1}, X_n, X_{n+1}$ is denoted by $P_0, P_1, P_2, \ldots, P_{n-1}, P_n$. Furthermore, the distance from the side edge 26 to the grooves $X_0, X_1, X_2, \ldots, X_{n-1}, X_n, X_{n+1}$ of the light guiding panel 20 is denoted by $D_0, D_1, D_2, \ldots, D_{n-1}, D_n, D_{n+1}$. As light is transmitted through the side edge 26 of the light guiding panel 20, a larger part of the light beam encounters the reflecting grooves near the side edge 26 than the part of the light beam encountering the reflecting grooves further away from the side edge 26. Thus, if the reflecting grooves $X_0, X_1, X_2, \ldots, X_{n-1}, X_n, X_{n+1}$ are distributed evenly throughout the upper surface 22 of the light guiding panel 20, more light will be reflected towards the lower surface 24 and the display 100 near the light source 50. The illumination to the display 100 appears to be much brighter on the light source side than the rest of the display 100. This uneven illumination effect will become more pronounced when the thickness, or the distance between the upper surface 22 and the lower surface 24, of the light guiding device 20 is reduced. In order to reduce this uneven illumination effect, it is preferred that, as the distance D from the grooves X increases, the spacing P decreases so that the distribution density of the grooves X increases with the distance D. For example, because $D_0<D_1$, we have $P_0>P_1$. Such a distribution density of the grooves X can improve the uniformity of illumination of the display 100.

Figure 3B:
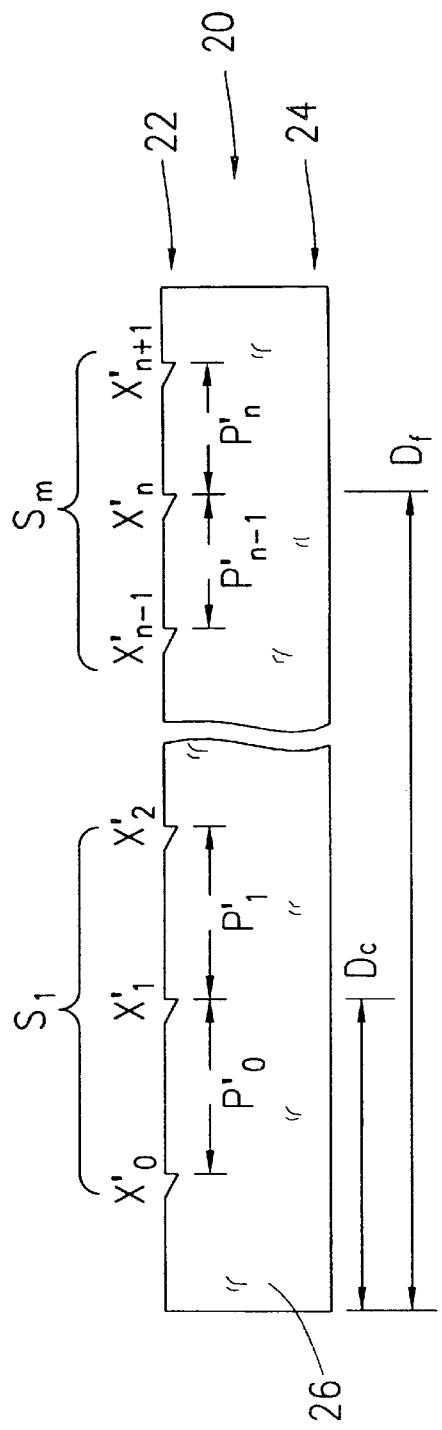
FIG. 3b is a cross sectional view illustrating the distributing density of the reflecting grooves on the upper surface of the light guiding panel, according to another embodiment of the present invention.

Alternatively, the distribution density of the reflecting grooves X can be made to vary in another fashion, as shown in FIG. 3b. As shown in FIG. 3b, the reflecting grooves are grouped into surface sections $S_1, S_2, \ldots, S_m$ with each surface section having an equal number of reflecting grooves. For example, the surface section $S_m$ has three reflecting grooves $X'_0, X'_1, X'_2$, and the surface section $S_m$ has three reflecting grooves $X'_{n-1}, X'_n, X'_{n+1}$. The grooves X' within a surface section S may be evenly spaced. For example, within the surface section $S_1$, we have $P'_0=P'_1$. Similarly, within the surface section $S_m$, we have $P'_{n-1}=P'_n$. However, because the distance $D_c$ from the side edge 26 to the surface section $S_1$ is smaller than the distance $D_f$ from the side edge 26 to the surface section $S_m$, it is preferred that $P'_0>P'_n$. Thus, the distribution density of the grooves X' effectively increases with the distance from the side edge 26 to the reflecting grooves X'. Such a distribution of the grooves X' can also improve the illumination of the display 100.

It is also possible to provide light sources to two side edges 26, 26', as shown in FIG. 3c. In that case, one half of the upper surface 22 is provided with reflecting grooves $X_0$, $X_1$, $X_2$ and the other half is provided with reflecting grooves $X''_0, X''_1, X''_2$ with $P''_0>P''_2$.

Figure 4:
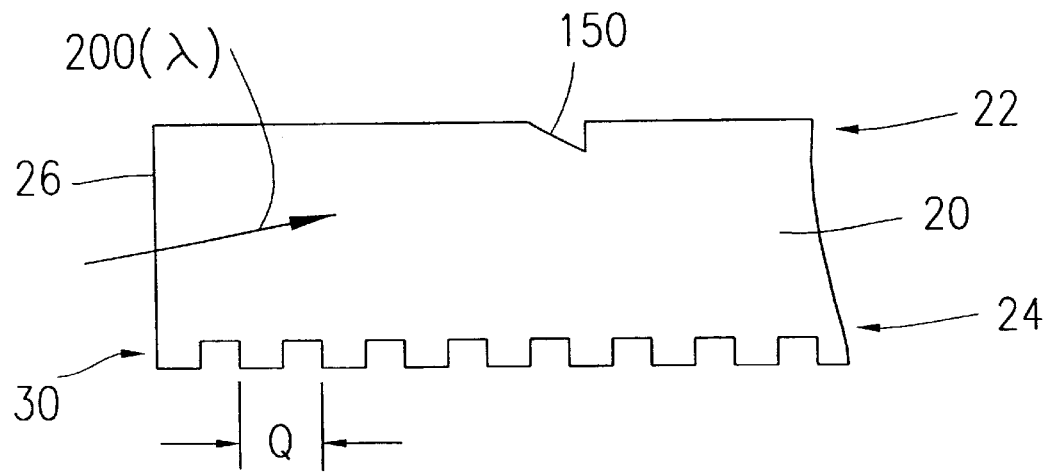
FIG. 4 is a cross sectional view illustrating the structure of the reflection reduction structure, according to the present invention.

In order to reduce the Fresnel reflection at the lower surface 24 of the light guiding panel 20, it is desirable to have the reflection reduction structure 30 provided on the lower surface 24. It is preferred that the reflection reduction structure 30 includes a plurality of periodic grooves, as shown in FIG. 4. Such periodic grooves can be produced as an integral part of the light guiding panel 20. For example, the periodic grooves can be produced on the lower surface 24 by a molding process or a pressing process concurrently with or separately from the production of the reflecting grooves X on the upper surface 22 to reduce the production cost of the reflection reduction structure 30. The spacing between adjacent grooves is denoted by letter Q, and the depth of the grooves is denoted by letter h. If the light introduced into the light guiding panel has a dominant wavelength $\lambda$, it is preferred that the spacing Q is smaller than half the dominant wavelength $\lambda$. The antireflection properties of the periodic grooves are well known in the art (see, for example, Diffractive Optics for Industrial and Commercial Application, ed. J. Turunen and F. Wyrowski, Akademie Verlag, 1997, pp. 308-311).

The reflecting grooves X and X" on the upper surface 22 of the light guiding panel 20 can be made by many different ways. For example, laser lithography can be used to make the grooves on a master plate, and a replica of the master plate can be made by an electrolysis process. This replica is known as a nickel shim-plate. The reflection reduction structure 30 can also be made on a master plate by interferometric lithography or electron-beam lithography, and a nickel shim-plate is made from the master plate. These shim-plates are then used as molds for hot embossing or injection molding. Using shim-plates for making a fine surface structure is well known in the art.

Figure 5:
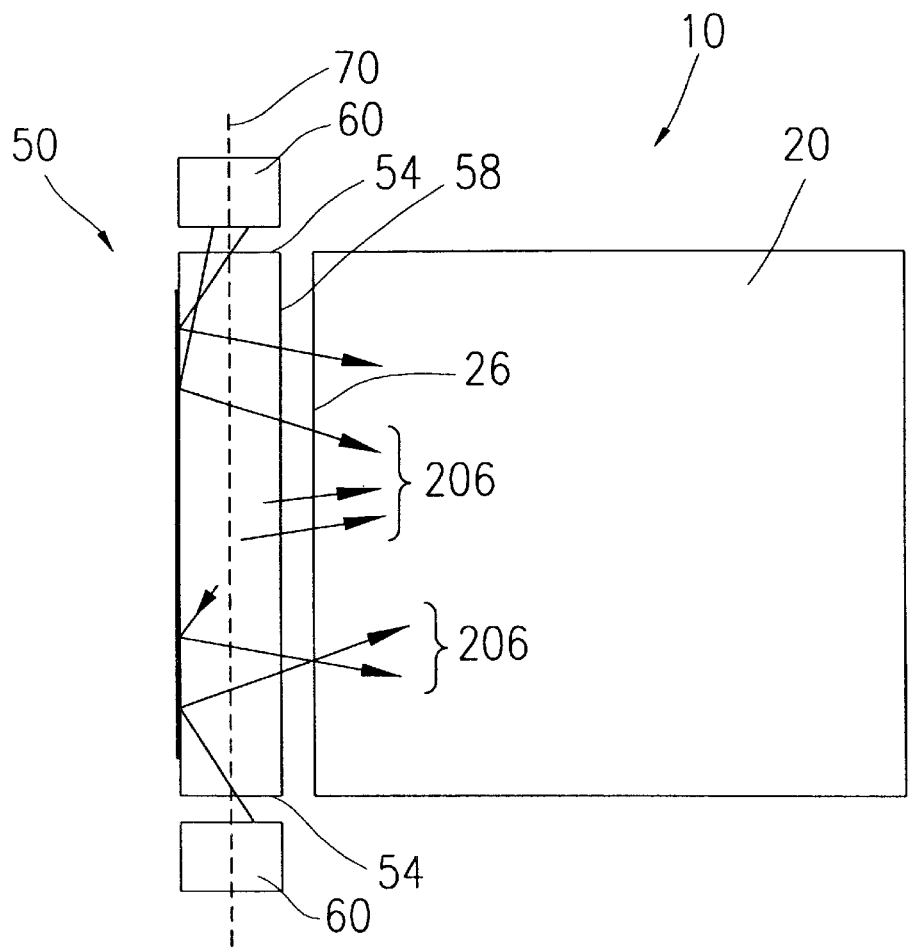
FIG. 5 is diagrammatic representation of a linear light source located near one edge of the light guiding panel.
Figure 6:
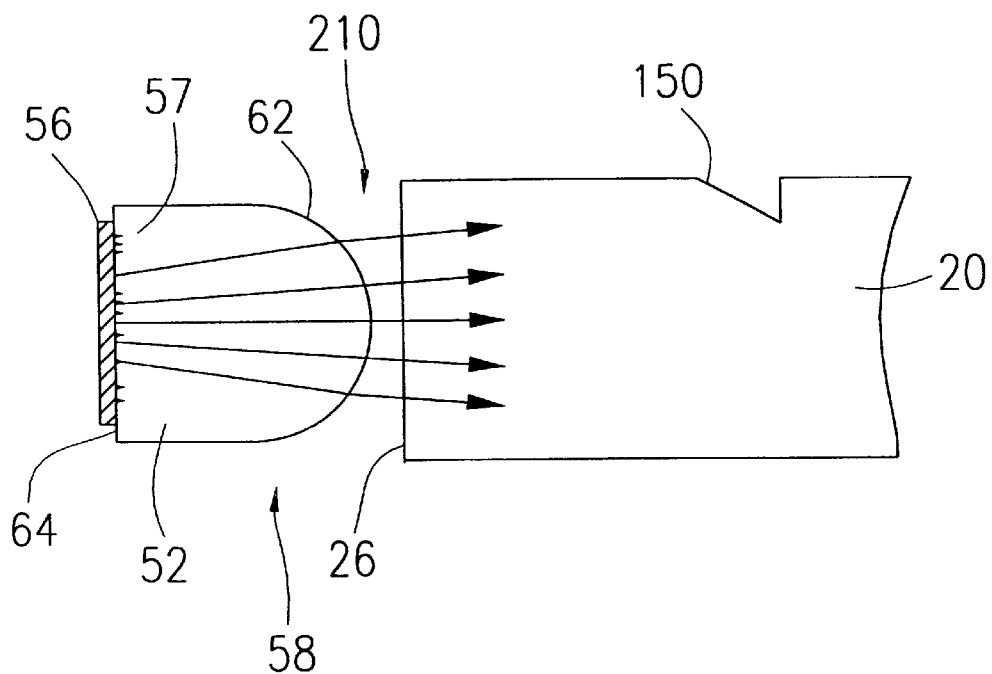
FIG. 6 is a cross sectional view illustrating the shape of the light pipe, according to the present invention.

FIG. 5 shows the structure of the linear light source 50 which is located near the side edge 26 of the light guiding panel 20 to provide light to the light guiding panel 20. As shown in FIG. 5, the linear light source 50 includes a linear light pipe 52 having two ends 54 and a reflection enhancing surface 56 to help directing light rays 206 towards the side edge 26 of the light guiding panel 20. One or more light emitters 60 are placed near the ends 54 of the light pipe 52 to provide light to the light pipe 52. The light emitter 60 can be a light-emitting diode or any other light-emitting device. The light pipe 52 has a longitudinal axis 70 and a peripheral surface 58 surrounding the longitudinal axis 70. The cross section of light pipe 52, for illustrating the peripheral surface 58 and part of the light guiding panel 20, is shown in FIG. 6.

As shown, it is preferred that the peripheral surface 58 includes a front section 62 adjoining a back section 64, wherein the back section 64 includes a reflecting surface 56 having a plurality of scatterers 57 to direct light towards the front section 62. It is also preferred that the front section, which faces the side edge 26 of the light guiding panel 20, is curved so that when light rays 210 encounter the front section 62 as they are exiting the light pipe 52, the divergence of the light rays 210 is reduced. Thus, the shape of the front section 62 helps focus the light rays exiting the light pipe 52. For example, the front section 62 can be spherical or aspherical. The reflecting surface 56 can be made of a diffraction grating and/or a silvered surface.

Figure 7A:
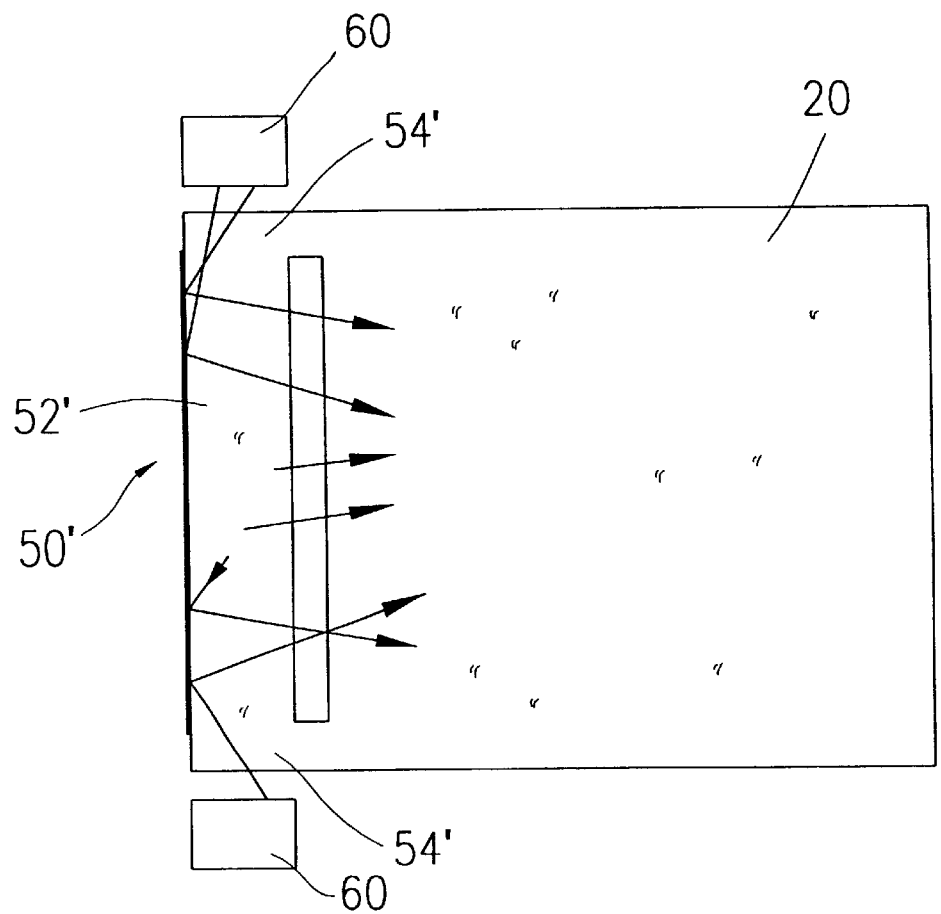
FIG. 7a is a diagrammatic representation illustrating another embodiment of the light guiding panel wherein the light pipe is an integral part of the light guiding panel.
Figure 7B:
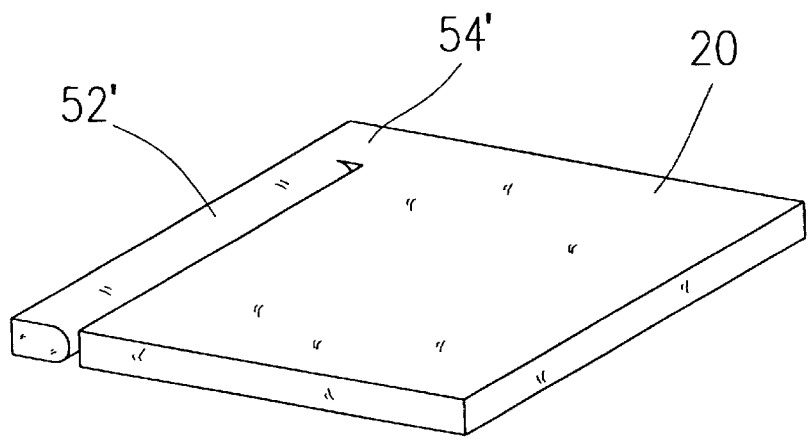
FIG. 7b is a sectional view illustrating the integration of the light pipe to the light guiding panel.

FIGS. 7a and 7b illustrate another embodiment of the lighting device. As shown, the light device 10' includes a linear light source 50', which is an integral part of the light guiding panel 20. As shown in FIG. 7a, the two ends 54' of the light pipe 52' are connected to the light guiding panels 20, and the light pipe 52' remains detached from the light guiding panels 20. FIG. 7b shows a sectional view of the lighting device, as shown in FIG. 7a.

Figure 8:
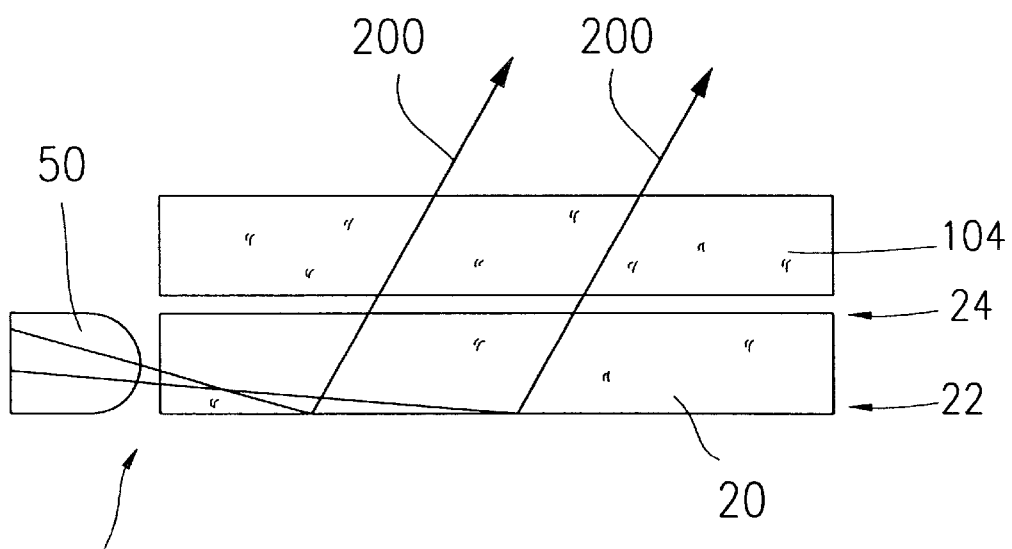
FIG. 8 is a diagrammatic representation illustrating a light guiding panel being used for back lighting.

It should be noted that the lighting device 10 has been disclosed as a front-lighting device, as shown in FIGS. 1 to 7b. The same device can be used as a back lighting device, as shown in FIG. 8. As shown, the lighting device 10 is placed behind a transmissive display 104, with the "upper" surface 24 of the light guiding panel 20 being further away from the bottom of the display 104 than the "lower" surface 22. It should be noted that, for back lighting purposes, it is not necessary to have a reflection reduction structure between the transmissive display 104 and the lighting device 10.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method for improving lighting of a display having a top surface for viewing, said method comprising the steps of:

providing a light guiding panel substantially on the top surface of the display; and providing at least one light source adjacent to the light guiding panel for providing light thereto, wherein the light guiding panel has a first surface adjacent to the top surface of the display, a second surface opposite to the first surface, and at least one side edge for admitting a portion of the light provided by the light source through the side edge into the light guiding panel between the first and second surfaces, wherein the second surface includes a plurality of grooves having dense-rare boundaries substantially facing the light source for reflecting part of the admitted light in a total-internal reflection fashion towards the display through the first surface of the light guiding panel, and the dense-rare boundaries have a distribution density which varies according to a distance between the dense-rare boundaries and the side edge, and wherein the first surface includes a reflection reduction structure having a plurality of periodic grooves to reduce light rays reflected from the first surface toward the second surface.

2. The method of claim 1, wherein the distribution density increases with the distance.

3. The method of claim 1, wherein the light rays encounter the first surface at an angle of incidence smaller than 30 degrees.

4. The method of claim 1, wherein the light provided by the light source has a dominant wavelength range and the periodic grooves have a pitch, which is smaller than half the dominant wavelength range.

5. The method of claim 1, wherein the display is an LCD panel.

6. A lighting apparatus for illuminating a display having a top surface for viewing, said apparatus comprising:

a light guiding panel located substantially on the top surface of the display; and at least one linear light source located adjacent to the light guiding panel for providing light thereto, wherein the light guiding panel has a first surface adjacent to the top surface of the display, a second surface opposite to the first surface, and at least one side edge for admitting a portion of the light provided by the linear light source through the side edge into the light guiding panel between the first and second surfaces, and the second surface includes a plurality of elongated grooves having dense-rare boundaries for reflecting part of the admitted light in a total-internal reflection fashion towards the display through the first surface of the light guiding panel, wherein the dense-rare boundaries have a distribution density which varies depending on a distance between the dense-rare boundaries and the side edge, and wherein the first surface includes a reflection reduction structure having a plurality of periodic grooves to reduce light rays reflected from the first surface toward the second surface.

7. The lighting apparatus of claim 6, wherein the distribution density increases with the distance.

8. The lighting apparatus of claim 6, wherein said light rays encounter the first surface at an angle of incidence smaller than 30 degrees.

9. The lighting apparatus of claim 6, wherein the light provided by the linear light source has a dominant frequency range, and the periodic grooves have a pitch which is smaller than the dominant frequency range.

10. The lighting apparatus of claim 6, wherein the linear light source includes:

a linear light pipe having a peripheral surface and at least one light-input end; and at least one light emitter adjacent the light-input end for providing light thereto, wherein the peripheral surface allows the light provided by the light emitter to transmit therethrough towards the side edge of the light guiding panel.

11. The lighting apparatus of claim 10, wherein the linear light pipe has a longitudinal axis substantially parallel to the side edge, and the peripheral surface has a cross section substantially perpendicular to the longitudinal axis, wherein the cross section includes a curved section adjoining a reflecting surface which is located away from the side edge of the light guiding panel in order to reflect light towards the side edge through the curved section.

12. The lighting apparatus of claim 11, wherein the reflecting surface includes a plurality of light scatterers.

13. The lighting apparatus of claim 11, wherein the curved section has a spherical-shaped section adjacent the side edge for focusing the light reflected by the reflecting surface towards the side edge.

14. A light guiding panel comprising:

a first surface;

an opposing second surface; and at least one side edge for admitting light into the light guiding panel between the first and second surfaces, wherein the first surface includes a plurality of elongated grooves having dense-rare boundaries for reflecting part of the admitted light in a total-internal reflection fashion towards the second surface, and the dense-rare boundaries have a distribution density which varies depending on a distance between the dense-rare boundaries and the side edge, and wherein the second surface includes a reflection reduction structure having a plurality of periodic grooves to reduce light rays reflected from the second surface toward the first surface.

15. The light guiding panel of claim 14, wherein the distribution density increases with the distance.

* * * * *

UNITED STATES PATENT AND TRADEMARK OFFICE
CERTIFICATE OF CORRECTION

PATENT NO. : 6,592,233 B1
DATED : July 15, 2003
INVENTOR(S) : Marko Parikka

It is certified that error appears in the above-identified patent and that said Letters Patent is hereby corrected as shown below:

Title page,
Item [56], References Cited, the following documents should be listed:
-- U.S. PATENT DOCUMENTS
| | | | |
|---|---|---|---|
| 5,835,661 | 11/1994 | Tai et al. | 385/146 |
| 5,694,247 | 12/1997 | Ophey et al. | 359/566 |
| 5,007,708 | 04/1991 | Gaylord et al. | 350/162.2 -- |

-- OTHER PUBLICATIONS,
"Subwavelength-Structure Elements" by M. Kuittinen et al., in "Diffractive Optics for Industrial and Commercial Applications", Edited by J. Turunen et al. (Akademie Verlag), 1998, pp. 303-311. --

-- FOREIGN PATENT DOCUMENTS, "0979991" should be -- 0879991 --.

Item [75], Inventor, "Halikko" should be -- Salo --.

Drawings,
Figure 4, -- 32 -- should be inserted.

Column 5,
Line 14, "$S_m$" should be -- $S_1$ --.
Lines 28-32, should be deleted.
Line 47, "panel has" should be -- panel 20 has --.

Signed and Sealed this

Eighteenth Day of November, 2003

JAMES E. ROGAN
*Director of the United States Patent and Trademark Office*